F4788 X5 75 7,374

BEST AVAILABLE COPY

L. B. RAYMOND & W. HANLEY.
Said Hanley Assignor by mesne Assignments to Melvin De Puy.

COUPLINGS FOR CANAL BOATS.

No. 7,374. Reissued Oct. 31, 1876.

Witnesses.
N. Cowles
N. H. Sherburne

Inventors:
Levi B. Raymond
William Hanley
By Gridley & Sherburne
Attys

BEST AVAILABLE COPY

UNITED STATES PATENT OFFICE.

LEVI B. RAYMOND AND WILLIAM HANLEY, OF LOCKPORT, ILLINOIS; SAID HANLEY ASSIGNOR, BY MESNE ASSIGNMENTS, TO MELVIN DE PUY.

IMPROVEMENT IN COUPLINGS FOR CANAL-BOATS.

Specification forming part of Letters Patent No. 75,645, dated March 17, 1868; reissue No. 7,374, dated October 31, 1876; application filed October 14, 1876.

*To all whom it may concern:*

Be it known that we, LEVI B. RAYMOND and WILLIAM HANLEY, of Lockport, in the county of Will and State of Illinois, have invented certain new and useful Improvements in Canal-Boats; and we do hereby declare the following to be a full, clear, and exact description thereof, which will enable others skilled in the art to which our invention appertains to make and use the same, reference being had to the accompanying drawing, forming part of this specification, in which—

Figure 1:
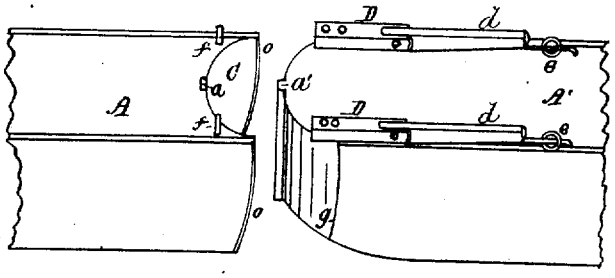
Figure 2:
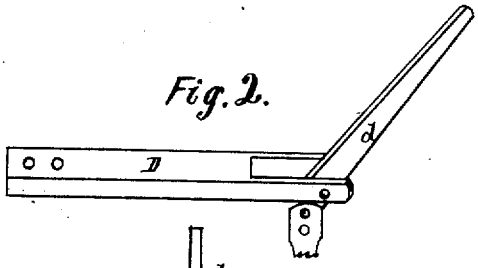
Figure 3:
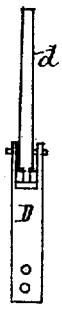

Figure 1 represents a perspective view of the bow and stern, respectively, of two canal-boats embodying our invention. Fig. 2 is an isometrical view of one of the couplings employed in coupling one boat to the other, and Fig. 3 is a general plan or top view of the same.

Like letters of reference indicate like parts.

The object of our invention is to so connect two canal-boats together in a line, one forward of the other, as that the front boat can be propelled and guided by the rear boat. To that end our invention consists in providing the stern of the forward boat with a notch or channel to receive the bow or cut-water of the rear boat, and in such a manner as to prevent the stern of the forward boat from being displaced laterally from a line with the bow of the rear boat; also, in the means employed for coupling the boats together, all of which is hereinafter more fully described.

In the drawing, A represents the forward section or boat, and A′ the rear section or boat, and both are of the usual size of the ordinary canal-boats. The stern of the forward section or boat A is concaved, so as to form a recess, C, to receive the bow of the rear section or boat A′ when the two sections or boats are coupled together. The stern of the forward boat is also provided with a notch or channel, *a*, formed centrally therein, and adjusted to receive the cut-water *a′* of the rear section, when the two sections or boats are coupled or otherwise united together in line, the one forward of the other. The notch or channel, when the cut-water of the rear boat is adjusted therein, prevents the stern of the forward boat from being moved laterally from in line with the bow of the rear boat, and thereby enables the forward section or boat to obey the helm of the rear boat as perfectly as if the whole or both sections were an entire section or boat. D D represent the coupling-arms, each of which is connected to a lever, *d*, hinged to the deck of one of said sections or boats, and extends from one boat to the other, and said arms are adjusted to engage with pins *f f*, respectively. The said arms are operated by the levers *d*, which, when the boats are required to be drawn together, are brought down to the deck and secured in a fixed position by the rings *e*, as shown in Fig. 1.

The bow of the rear boat or section A′ may be provided on each side with recesses *g*, to receive the stern-post *o* of the forward boat, for the purpose of aiding to keep the boats or sections in line, one with the other, and to give to said boats the appearance of one entire boat.

In using said boats it is only necessary to provide the rear boat with machinery for propelling both sections or boats, and only necessary to employ one crew, the forward boat being wholly controlled by the rear boat. When it is necessary to pass through a lock the boats are disconnected, and passed separately through the lock, when they are again coupled together.

Having thus described our invention, what we claim as new, and desire to secure by Letters Patent, is—

1. The notch or channel *a*, arranged within the stern of the forward boat A, and adjusted to receive the cut-water *a′* of the rear boat A′, in combination with a coupling for uniting the two boats together, substantially as and for the purpose specified.

2. The combination of the coupling, consisting of the arms D, pins *f f*, levers *d d*, and rings *e e*, with boats A and A′, substantially as and for the purpose specified.

LEVI B. RAYMOND.
WILLIAM HANLEY.

Witnesses:
STEPHEN DOWSE,
N. S. RAFFERTY.